United States Patent

[11] 3,622,574

[72] Inventors William Blythe Wright, Jr.
Woodcliff Lake, N.J.;
Herbert Joseph Brabander, Nanuet, N.Y.
[21] Appl. No. 827,131
[22] Filed May 23, 1969
[45] Patented Nov. 23, 1971
[73] Assignee American Cyanamid Company
Stamford, Conn.
Continuation-in-part of application Ser. No. 747,805, July 26, 1968, now abandoned. This application May 23, 1969, Ser. No. 827,131

[54] N-(MORPHOLINO ALKYL)-BENZO[B]THIOPHENE-2-CARBOXAMIDES
9 Claims, No Drawings

[52] U.S. Cl. ................................................ 260/247.1, 424/248

[51] Int. Cl. ........................................................ C07d 87/46
[50] Field of Search ............................................ 260/247.1

[56] References Cited
OTHER REFERENCES

Campaigne et al. J. Org. Chem. Vol. 26, pages 1327–29

Primary Examiner—Alex Mazel
Assistant Examiner—Jose Tovar
Attorney—Ernest Y. Miller ABSTRACT: The preparation of N-(morpholinoalkyl)benzo[b]thiophene-2-carboxamides from benzo[b]thiophene-2-carboxamides by reaction with an alkylenediamine, is described. The compounds are also prepared by other methods such as from benzo[b]thiophene-2-carbonyl chlorides by reaction with an alkylenediamine. The products are useful as depressants and antidepressants.

N-(MORPHOLINO ALKYL)-BENZO[B]THIOPHENE-2-CARBOXAMIDES

CROSS REFERENCE TO RELATED APPLICATIONS

This application is a continuation-in-part of our application, Ser. No. 747,805, filed July 26, 1968, now abandoned.

SUMMARY OF THE INVENTION

This invention relates to new compounds. More particularly, it relates to novel N-(morpholinoalkyl)benzo[b]thiophene-2-carboxamides and methods of preparing the same.

The novel compounds of the present invention may be illustrated by the following formula:

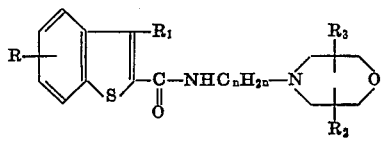

wherein R is selected from the group consisting of hydrogen, lower alkyl, halogen and trifluoromethyl; $R_1$ is selected from the group consisting of hydrogen, lower alkyl and halogen; $R_2$ and $R_3$ are selected from the group consisting of hydrogen and lower alkyl; $n$ is an integer from 2 to 6 and nontoxic acid addition salts thereof.

More particularly, the preferred compounds of this invention are those in which R and $R_1$ are hydrogen or halogen, $R_2$ and $R_3$ are hydrogen and $n$ is 2 to 6.

The free bases of the active components of this invention, in general, may be either liquids or solids at room temperature. The free bases, are in general, relatively insoluble in water, but soluble in most organic solvents such as lower alkyl alcohols, benzene, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention can be prepared by one of the following methods of which the first method has been found most advantageous.

FIRST METHOD

A reactive benzo[b]thiophene-2-carboxamide is prepared as an intermediate followed by reaction with the alkylene diamine.

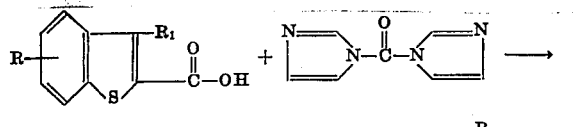

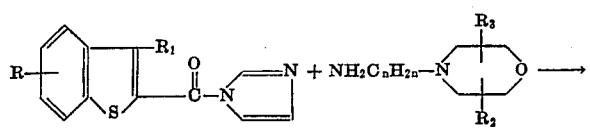

wherein R, $R_1$, $R_2$, $R_3$, and $n$ are as hereinbefore defined. This reaction is best carried out in two steps and tetrahydrofuran is a satisfactory solvent. A temperature range of 25°–75° C. is most desirable.

SECOND METHOD

These compounds of the present invention can also be prepared by other methods. One of these involves the preparation of a benzo[b]thiophene-2-carbonyl chloride as an intermediate followed by reaction with an alkylenediamine:

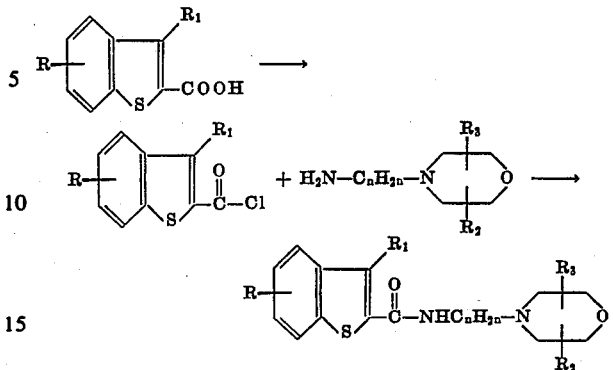

wherein R, $R_1$, $R_2$, $R_3$ and $n$ are as defined hereinbefore.

In this process, the benzo[b]thiophene-2-carboxylic acid is reacted with a halogenating agent such as thionyl chloride in an inert solvent. The benzo[b]thiophene-2-carboxylic acid chloride is isolated and reacted with an alkylenediamine derivative. The products are removed and purified by recrystallization from a suitable solvent. Alternatively, an ester or acid anhydride may be prepared as the intermediate.

THIRD METHOD

In still another method, the acid and the alkylene diamine are mixed and a carbodiimide derivative is added to effect condensation.

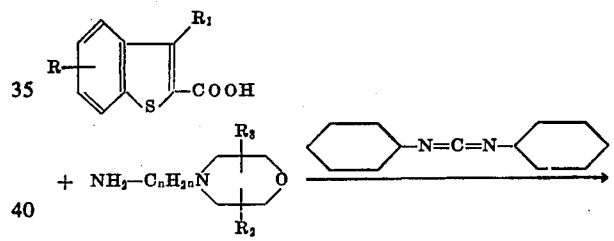

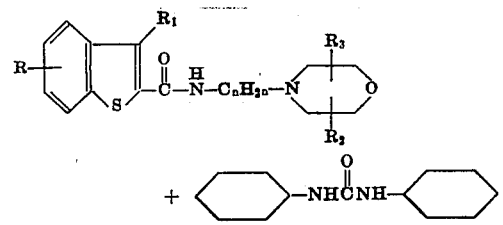

This reaction may usually be carried out within a temperature range of 25°–100° C. and the product is isolated by procedures well known to the art.

FOURTH METHOD

A still further method can be used in which benzo[b]thiophene-2-carboxamides are used as intermediates for alkylation procedures as follows:

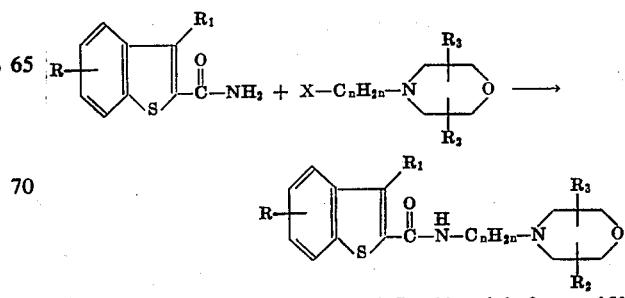

wherein R, $R_1$, $R_2$, $R_3$, and $n$ are as defined hereinbefore and X is a reactive halogen, lower alkyl sulfonyloxy or arylsulfonyloxy group. The amide is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30°–200° C. for a period of from 30 minutes to 6 hours.

FIFTH METHOD

Still another method of preparation consists of first preparing the N-(bromoalkyl)benzo[b]thiophene-2-carboxamide and then reacting this with morpholine or a morpholine derivative.

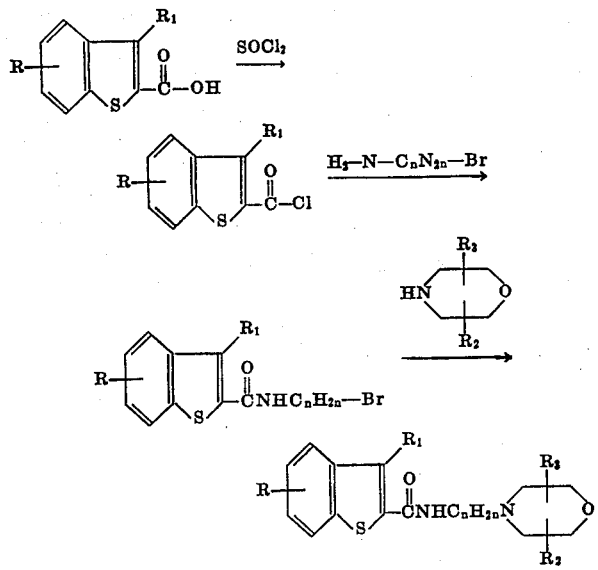

wherein R, $R_1$, $R_2$, $R_3$ and $n$ are as defined hereinbefore. The reaction in the last step takes place when the reagents are contacted in an inert solvent such as ethanol, tetrahydrofuran, toluene, benzene and the like and the reagent mixture is maintained within the temperature of from about 50° to 150° C. for a period of 10 minutes to several hours.

The benzo[b]thiophene-2-carboxylic acids used as intermediates in the above methods, are prepared by standard literature procedures, D. A. Shirley and M. D. Cameron, J. Am. Chem. Soc. 72, 2788 (1950). N. B. Chapman, K. Clarke, S. D. Saraf, J. Chem. Soc. 1967 (8), 731. Y. Matsuki, et al., Nippon Kagaku Zasshi 88, 756 (1967), 86, 102, 643, (1965). J. Schmitt, M. Suquet, P. Comoy, T. Clim and G. Callet, Bull. Soc. Chim. France 1968, (11), 4575. A. J. Krubsack and T. Higa, Tetrahedron Letters No. 49, p. 5149, (1969).

Compounds of the present invention are physiologically active in warm-blooded animals as antidepressants. intraperitoneally antidepressant properties of the compounds are evident by measuring the ability to counteract in animals a depression induced by the administration of tetrabenazine hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. Thirty minutes later the antidepressant treated groups are place individually at the center of a horizontal disc about 18 inches in diameter. Within a short period of time, these individuals show normal exploratory behavior such as walking to the edge and looking over the side or other characteristic movements related to the normal tendency to explore a new environment. Individuals, treated with tetrabenazine hexamate alone or in a combination with an ineffective antidepressant agent do not show this normal exploratory behavior, but remain at the center of the disc for a considerable period of time. Compounds of this invention show desirable antidepressant properties by this procedure at dose levels which are well below the lethal level, thereby demonstrating a satisfactory therapeutic index of safety. These compounds compare favorably with effective antidepressant drugs such as imipramine and amitryptyline when tested by the above techniques.

We have also found that some of the compounds of the present invention are surprisingly unique in that, in addition to central nervous system antidepressant activity, they show central nervous system depressant activity. This is evident by the ability to protect animals against convulsive seizures caused by strychnine, by reducing their ability to traverse a horizontal rod in a normal manner and by reducing motor activity. This combination of depressant and antidepressant activity indicates a wide range of therapeutic utility in mental disorders of various types, for example, in the management of depressive states, in the treatment of convulsive disorders such as epilepsy, and in the alleviation of anxieties. It has been reported [Gluckman, M.I., Pharmacology of oxazepam (Serax), a new antianxiety agent, Curr. Therap. Res., 7, 721 (1965)] that there is a high degree of correlation between anticonvulsant effects in animals and antianxiety effects in man. One measure of depressant activity is the ability to prevent convulsive seizures in warm-blooded animals, e.g., mice, caused by strychnine sulfate [H. M. Hanson and C. A. Stone, "Animal and Clinical Pharmacological Techniques in Drug Evaluation," Vol. I. J. H. Nodine and P. E. Siegler, Ed., Yearbook Medical Publishers Inc., Chicago, Ill., 1964, p. 317.] Graded dose levels of the compounds are administered intraperitoneally in a 2 percent aqueous starch medium to groups of 10 mice at each dose. Strychnine sulfate, dissolved in aqueous saline is administered subcutaneously at doses estimated to cause toxic extensor seizures in 95 percent of the mice (0.82 milligrams per kilogram of body weight.) Strychnine is administered 30 minutes after drug treatment. The median effective dose is calculated by the method of Litchfield, J. T. & Wilcoxon, F., "A Simplified Method of Evaluating, Dose-effect Experiments", Journal of Pharmacology & Experimental Therapeutics, Volume 96, page 99–113 (1949).

A test which indicates hypnotic- and/or muscle-relaxant-type activity is represented by the following rod walking test. Groups of six mice each are tested for their ability to walk across a horizontal rod in a normal manner after receiving graded interperitoneal doses of a compound. A median effective rod walking dose (RWD) is estimated.

A test which indicates tranquilizing activity is represented by a measure of the reduction in motor activity. One-half of the (RWD) dose is given to a group of five mice and a 5 minute count of motor activity is recorded (actophotometer). Counts of ≲250 are considered to indicate a specific reduction (more than two standard deviations) of activity at a dose causing only minimal impairment of neurological function as measured by rod walking ability. Compounds that appear to reduce motor activity (≲250 count) are administered to additional groups of five mice at graded doses and tested similarly. The motor depression dose (MDD) which causes a 50 percent reduction of motor activity (a count of 250) is estimated. The use of reduced motor activity as a measure of tranquilizing activity has been described by W. D. Gray, A. C. Osterberg and C. E. Rauh, Archives Internationales de Pharmacodynamic et de Therapie, Vol. 134, p. 198 (1961) and W. J. Kinnard and C. J. Carr, Journal of Pharmacology and Experimental Therapeutics, Vol. 121, 354 (1957).

As a test for toxicity or margin of safety, the compounds that did specifically reduce motor activity are given to 10 mice at a dose of 10X MDD. The compounds that did not reduce motor activity are given to 10 mice at a dose of 4X RWD. If more than 50 percent of the mice die within 24 hours, the compound is rejected for reasons of toxicity or low margin of safety. If less than 50 percent of the mice die, the compound is considered interesting for further study.

Among the active compounds of the present invention are the following:

TABLE I

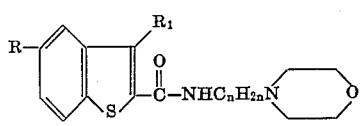

TABLE I

| | | | Lowest Effective Dose (mg./kg.) | | | |
|---|---|---|---|---|---|---|
| R | R₁ | n | Anti-depressant | Motor Depressant | Rod Walking | Anti-convulsant |
| H | H | 2 | 3.1 | | | |
| H | H | 3 | 3.1 | | | |
| H | CH₃ | 2 | 6.3 | | | |
| Br | H | 3 | 25 | | | |
| Cl | H | 2 | 1.6 | 32 | | |
| Br | H | 2 | 25 | 28 | | |
| H | CH₃ | 3 | 12.5 | 6 | | |
| H | Br | 3 | 25 | 53 | | |
| Cl | H | 4 | 25 | 15 | 36 | 25 |
| H | | 3 | | 14 | 81 | 13 |
| Cl | H | 5 | | 15 | 50 | 26 |
| H | H | 5 | | 18 | 58 | |
| H | H | 4 | | | 90 | |

Compositions containing morpholinoalkylbenzo[b]thiophene-2-carboxamides may be administered to warm-blooded animals orally, or parenterally if desired, and when so administered, may be considered as an agent for therapeutically desirable treatment of mental disorders in daily doses ranging from about 5 to about 100 milligrams. The dosage regimen can be adjusted to provide optimum therapeutic response. Thus, for example, several smaller doses may be administered daily, or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragees, capsules, suppositories, liquids, elixirs, emulsions, suspensions, syrups, chocolate, candy, wafers, chewing gum, or the like. Such compositions and preparations should contain at least 0.1 percent of active component. The percentage in the compositions and preparations, may, of course, be varied, and may conveniently be between 2 percent and 60 percent or more of the weight of the unit. The amount of compound in such therapeutically useful compositions or preparations is such that a suitable dosage will be obtained. Preferred compositions or preparations according to the present invention are prepared so that a dosage unit form contains between about 5 and about 100 milligrams of the morpholinoalkylbenzo[b]thiophene-2-carboxamides. Obviously in addition to the therapeutic compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE 1

Preparation of N-(2-Morpholinoethyl)benzo[b]thiophene-2-carboxamide

A mixture of 5.3 parts of benzo[b]thiophene-2-carboxylic acid and 5.2 parts of N,N'-carbonyldiimidazole in 100 parts of tetrahydrofuran is allowed to stand at room temperature for 1 hour and 5.9 parts of N-(2-aminoethyl)-morpholine are added. The reaction mixture is kept overnight at room temperature and then concentrated to remove the solvent. Water (100 parts) and 10 parts of 5N sodium hydroxide are added and the crystalline product is filtered off, washed with water, and dried. As an alternative procedure, the product may be extracted into benzene or chloroform and recovered by concentration. Recrystallization from ethyl acetate yields N-(2-morpholinethyl)-benzo[b]thiophene-2-carboxamide, melting point 130°–132° C.

When the above product is dissolved in chloroform, and treated with ethanolic hydrogen chloride, the hydrochloride salt, melting point 243°–245° C. is obtained.

EXAMPLE 2

Preparation of N-(3-Morpholinopropyl)benzo[b]thiophene-2-carboxamide

When N-(3-aminopropyl)morpholine is used in place of N-(2-aminoethyl)morpholine in the procedure of example 1, the above compound, melting point 117°–119° C., is obtained. The hydrochloride salt melts at 183°–185° C.

EXAMPLE 3

Preparation of N-(2-Morpholinopropyl)benzo[b]thiophene-2-carboxamide

The above compound, melting point 176°–178° C., is obtained when N-(2-amino-1-methylethyl)morpholine is substituted for N-(2-aminoethyl)morpholine in the procedure of example 1. The hydrochloride salt melts at 234°–236° C.

EXAMPLE 4

Preparation of 5-Chloro-N-(2-morpholinoethyl)benzo[b]thiophene-2-carboxamide

This compound, melting point 118°–120° C., is obtained when benzo[b]thiophene-2-carboxylic acid is replaced by 5-chlorobenzo[b]thiophene-2-carboxylic acid in the procedure of example 1. The hydrochloride salt melts at 233°–235° C.

EXAMPLE 5

Preparation of 5-Chloro-N-(3-morpholinopropyl)benzo[b]thiophene-2-carboxamide

When 5-chlorobenzo[b]thiophene-2-carboxylic acid is reacted with N-(3-aminopropyl)morpholine by the procedure of example 1, the above compound, melting point 126°–128° C., is obtained. The hydrochloride salt as a monohydrate melts at 131°–133° C.

EXAMPLE 6

Preparation of 6-Bromo-N-(2-morpholinoethyl)benzo[b]thiophene-2-carboxamide.

The above compound is obtained when 6-bromobenzo[b]thiophene-2-carboxylic acid is substituted for benzo[b]thiophene-2-carboxylic acid in the procedure of example 1.

EXAMPLE 7

Preparation of 6-Chloro-N-(2-morpholinoethyl)benzo[b]thiophene-2-carboxamide

If 6-chlorobenzo[b]thiophene-2-carboxylic acid is substituted for benzo[b]thiophene-2-carboxylic acid in the procedure of example 1, the above compound is obtained.

EXAMPLE 8

Preparation of 3,7-Dimethyl-N-(2-morpholinoethyl)benzo[b]thiophene-2-carboxamide This compound is obtained when 3,7-dimethylbenzo[b]-thiophene-2-carboxylic acid is reacted with N-(2-aminoethyl)-morpholine by the procedure of example 1.

EXAMPLE 9

Preparation of 4-Bromo-7-methyl-N-(2-morpholinoethyl)benzo[bf]-thiophene-2-carboxamide When 4-bromo-7-methylbenzo[b]thiophene-2-carboxylic acid is reacted with N-(2-aminoethyl)morpholine as described in example 1, the above compound is obtained.

EXAMPLE 10

Preparation of 5-Trifluoromethyl-N-(2-morpholinoethyl)benzo[b]-thiophene-2-carboxamide The above compound is obtained when 5-trifluoromethyl-benzo[b]thiophene-2-carboxylic acid is substituted for benzo-[b]thiophene-2-carboxylic acid in the procedure of example 1.

EXAMPLE 11

Preparation of 5-Fluoro-N-(2-morpholinoethyl)benzo[b]thiophene-2-carboxamide

When 5-fluorobenzo[b]thiophene-2-carboxylic acid is substituted for benzo[b]thiophene-2-carboxylic acid in the procedure of example 1, this compound is obtained.

EXAMPLE 12

Preparation of 3-Bromo-N-(2-morpholinoethyl)benzo[b]thiophene-2-carboxamide

A mixture of 10 parts of benzo[b]thiophene-2-carboxylic acid, 100 parts of dimethylformamide and 10 parts of N-bromo-succinimide is allowed to stand at 25°–30° C. for 4 hours and then diluted with 500 parts of water. The precipitate is filtered off, washed with water, dried, and then recrystallized from methanol. The product, melting point 281°–284° C. is 3-bromobenzo[b]thiophene-2-carboxylic acid.

A mixture of three parts of 3-bromobenzo[b]thiophene-2-carboxylic acid and 2.1 parts of N,N'-carbonyldiimidazole in 125 parts of tetrahydrofuran is allowed to stand at room temperature for 1 hour and 2.5 parts of N-(2-aminoethyl)morpholine are added. The reaction mixture is left for 20 hours at room temperature and concentrated to remove the solvent. The residue is treated with five parts of 5N sodium hydroxide in 50 parts of water and extracted with chloroform. The chloroform layer is dried over magnesium sulfate and concentrated. The residue is triturated with ether and the precipitate is filtered off and recrystallized from ethyl acetate. The 3-bromo-N-(2-morpholinoethyl)benzo[b]thiophene-2-carboxamide melts at 115°–116° C. The hydrochloride salt melts at 208°–209° C.

EXAMPLE 13

Preparation of 3-Bromo-N-(3-morpholinopropyl)benzo[b]thiophene-2-carboxamide

The above compound, melting point 101°–102° C., is obtained when N-(3-aminopropyl)morpholine is substituted for N-(2-aminoethyl)morpholine in the procedure of example 12. The hydrochloride salt melts at 261°–263° C.

EXAMPLE 14

Preparation of 3-Chloro-N-(2-morpholinoethyl)benzo[b]thiophene-2-carboxamide

The above compound, melting point 97°–99° C. is obtained when 3-chlorobenzo[b]thiophene-2-carboxylic acid is substituted for benzo[b]-thiophene-2-carboxylic acid in the procedure of example 1.

EXAMPLE 15

Preparation of N-[3-(2,6-Dimethylmorpholino)propyl]benzo[b]-thiophene-2-carboxamide A solution of 19.7 parts of benzo[b]thiophene-2-carbonyl chloride in 200 parts of benzene is added with cooling and stirring to a mixture of 22 parts of 3-bromopropylamine hydrobromide, 32 parts of sodium carbonate, 150 parts of water and 100 parts of benzene. The mixture is stirred for 1 hour and the precipitate is filtered off, washed with water, dried, and recrystallized from ethanol. The product, melting point 130°–132° C., is N-(3-bromopropyl)benzo[b]thiophene-2-carboxamide.

A mixture of 3.0 parts of this material, 2.3 parts of 2,6-dimethylmorpholine and 100 parts of benzene is heated at reflux temperature for 2 hours and cooled. A mixture of three parts of 5N sodium hydroxide and 50 parts of water is added and the layers are separated. The benzene layer is washed with saturated salt solution, dried over magnesium sulfate, and concentrated. The oily residue is N-[3-(2,6-dimethyl-morpholino)-propyl]benzo[b]thiophene-2-carboxamide. The hydrochloride salt melts at 256°–258° C.

EXAMPLE 16

Preparation of N-[3-(3-methylmorpholino)propyl]benzo[b]thiophene-2-carboxamide

The above compound is obtained when 3-methyl-morpholine is substituted for 2,6-dimethylmorpholine in the procedure of example 15.

EXAMPLE 17

Preparation of 3-Methyl-N-(2-morpholinoethyl)benzo[b]thiophene-2-carboxamide

If 3-methylbenzo[b]thiophene-2-carboxylic acid is substituted for benzo[b]thiophene-2-carboxylic acid in the procedure of example 1, this compound, melting point 115°–117° C., is obtained. The hydrochloride salt melts at 192°–194° C.

EXAMPLE 18

Preparation of 3-Methyl-N-(3-morpholinopropyl)benzo[b]thiophene-2-carboxamide

This compound is obtained when 3-methylbenzo[b]thiophene-2-carboxylic acid is reacted with N-(3-aminopropyl)morpholine by the procedure of example 1. The hydrochloride salt melts at 213°–215° C.

EXAMPLE 19

Preparation of 3-methyl-N-(4-morpholinobutyl)benzo[b]thiophene-2-carboxamide

The above compound, melting point 129°–131° C., is obtained when 3-methylbenzo[b]thiophene-2-carboxylic acid is treated with N-(4-aminobutyl)morpholine by the procedure of Example 1. The hydrochloride salt melts at 220°–222° C.

EXAMPLE 20

Preparation of 3-methyl-N-(5-morpholinopentyl)benzo[b]thiophene-2-carboxamide

If 3-methylbenzo[b]thiophene-2-carboxylic acid and 5-morpholinopentylamine are caused to react by the procedure of example 1, the above compound, melting point 93°–95° C., is obtained. The hydrochloride salt melts at 171°–173° C.

EXAMPLE 21

Preparation of N-(4-morpholinobutyl)benzo[b]thiophene-2-carboxamide

The above compound, melting point 122°–124° C., is obtained when benzo[b]thiophene-2-carboxylic acid is reacted with 4-morpholinobutylamine by the procedure of example 1. The hydrochloride salt melts at 226°–228° C.

EXAMPLE 22

Preparation of N-(5-Morpholinopentyl)benzo[b]thiophene-2-carboxamide

This compound, melting point 121°–123° C., is obtained when 5-morpholinopentylamine and benzo[b]thiophene-2-carboxylic acid are reacted by the procedure of example 1. The hydrochloride salt melts at 235°–237° C.

EXAMPLE 23

Preparation of 4-Chloro-N-(2-Morpholinoethyl)benzo[b]thiophene-2-carboxamide

When 4-chlorobenzo[b]thiophene-2-carboxylic acid is substituted for benzo[b]thiophene-2-carboxylic acid in the procedure of example 1, the above compound is obtained.

EXAMPLE 24

Preparation of 4-Chloro-N-(3-morpholinopropyl)benzo[b]thiophene-2-carboxamide

If 4-chlorobenzo[b]thiophene-2-carboxylic acid and 3-morpholinopropylamine are reacted by the procedure of example 1, the above compound is obtained.

EXAMPLE 25

Preparation of 4-Chloro-N-(4-morpholinobutyl)benzo[b]thiophene-2-carboxamide

The above compound is obtained when 4-morpholinobutylamine is treated with 4-chlorobenzo[b]thiophene-2-carboxylic acid by the procedure of example 1.

EXAMPLE 26

Preparation of 5-Chloro-N-(4-morpholinobutyl)benzo[b]thiophene-2-carboxamide

This compound is obtained when 4-morpholinobutylamine is reacted with 5-chlorobenzo[b]thiophene-2-carboxylic acid by the procedure of example 1. The hydrochloride melts at 231°–233° C.

EXAMPLE 27

Preparation of 5-Chloro-N-(5-Morpholinopentyl)benzo[b]thiophene-2-carboxamide

If 5-Chlorobenzo[b]thiophene-2-carboxylic acid is reacted with 5-morpholinopentylamine by the procedure of example 1, the above compound is obtained. The hydrochloride salt melts at 211°–213° C.

EXAMPLE 28

Preparation of 5-Chloro-N-(6-Morpholinohexyl)benzo[b]thiophene-2-carboxamide

The above compound is obtained when 5-chlorobenzo[b]-thiophene-2-carboxylic acid is reacted with 6-morpholinohexylamine by the procedure of example 1.

EXAMPLE 29

Preparation of 5-Bromo-N-(2-morpholinoethyl)benzo[b]thiophene-2-carboxamide

When 5-bromobenzo[b]thiophene-2-carboxylic acid is substituted for benzo[b]thiophene-2-carboxylic acid in the procedure of example 1, the above compound, melting point 137°–139° C. is obtained. The hydrochloride salt melts at 213°–215° C.

EXAMPLE 30

Preparation of 5-Bromo-N-(3-morpholinopropyl)benzo[b]thiophene-2-carboxamide

The above compound, melting point 124°–126° C., is obtained when 5-bromobenzo[b]thiophene-2-carboxylic acid is treated with 3-morpholinopropylamine by the procedure of example 1.

EXAMPLE 31

Preparation of 5-Bromo-N-(4-morpholinobutyl)benzo[b]thiophene-2-carboxamide

This compound is obtained when 5-bromobenzo[b]thiophene-2-carboxylic acid is reacted with 4-morpholinobutylamine by the procedure of example 1. The hydrochloride salt melts at 224°–226° C.

EXAMPLE 32

Preparation of 5-Bromo-N-(5-morpholinopentyl)benzo[b]thiophene-2-carboxamide

When 5-morpholinopentylamine is reacted with 5-bromobenzo[b]thiophene-2-carboxylic acid by the procedure of example 1, the above compound is obtained.

EXAMPLE 33

Preparation of 3,6-Dichloro-N-(2-morpholinoethyl)benzo[b]thiophene-2-carboxamide The above compound, melting point 140°–142° C. is obtained when 3,6-dichlorobenzo[b]thiophene-2-carboxylic acid is used in place of benzo[b]thiophene-2-carboxylic acid in the procedure of example 1.

EXAMPLE 34

Preparation of 3-Chloro-6-methyl-N-(3-morpholinopropyl)benzo-[b]thiophene-2-carboxamide This compound is obtained when 3-chloro-6-methylbenzo-[b]thiophene-2-carboxylic acid is reacted with 3-morpholinopropylamine by the procedure of example 1.

EXAMPLE 35

Preparation of 3,5-Dichloro-N-(3-morpholinopropyl)benzo[b]thiophene-2-carboxamide When 3,5-dichlorobenzo[b]thiophene-2-carboxylic acid is treated with 3-morpholinopropylamine by the procedure of example 1, the above compound is obtained.

EXAMPLE 36

Preparation of 6-Methoxy-N-(2-morpholinoethyl)benzo[b]thiophene-2-carboxamide

This compound is obtained when 6-methoxybenzo[b]thiophene-2-carboxylic acid is substituted for benzo[b]thiophene-2-carboxylic acid in the procedure of example 1.

EXAMPLE 37

Preparation of 3-Chloro16-N-(2morpholinoethyl)benzo-[b]thiophene-2-carboxamide

When 3-chloro-6-methoxybenzo[b]thiophene-2-carboxylic acid is substituted for benzo[b]thiophene-2-carboxylic acid in the procedure of example 1, the above compound is obtained.

We claim:

1. A benzo[b]thiophene of the formula:

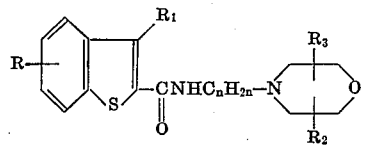

wherein R is selected from the group consisting of hydrogen, methyl, halogen and trifluoromethyl; $R_1$ is selected from the group consisting of hydrogen, methyl and halogen; $R_2$ and $R_3$ are selected from the group consisting of hydrogen and methyl; $n$ is an integer from 2 to 6 and nontoxic acid addition salts thereof.

2. The benzo[b]thiophene is accordance with claim 1: N-(2-morpholinoethyl)benzo[b]thiophene-2-carboxamide.

3. The benzo[b]thiophene in accordance with claim 1: N-(3-morpholinopropyl)benzo[b]thiophene-2-carboxamide.

4. The benzo[b]thiophene in accordance with claim 1: 5-chloro-N-(3-morpholinopropyl)benzo[b]thiophene-2-carboxamide.

5. The benzo[b]thiophene in accordance with claim 1: 5-chloro-N-(2-morpholinoethyl)benzo[b]thiophene-2-carboxamide.

6. The benzo[b]thiophene in accordance with claim 1: 5-bromo-N-(2-morpholinoethyl)benzo[b]thiophene-2-carboxamide.

7. The benzo[b]thiophene in accordance with claim 1: 5-chloro-N-(4-morpholinobutyl)benzo[b]thiophene-2-carboxamide.

8. The benzo[b]thiophene in accordance with claim 1: 3-methyl-N-(2-morpholinoethyl)benzo[b]thiophene-2-carboxamide.

9. The benzo[b]thiophene in accordance with claim 1: 5-chloro-N-(5-morpholinopentyl)benzo[b]thiophene-2-carboxamide.

* * * * *